Oct. 10, 1967     G. W. PAINTER ETAL     3,345,864
TRANSIENT SYNTHESIS METHOD AND APPARATUS
Filed July 14, 1964     4 Sheets-Sheet 1
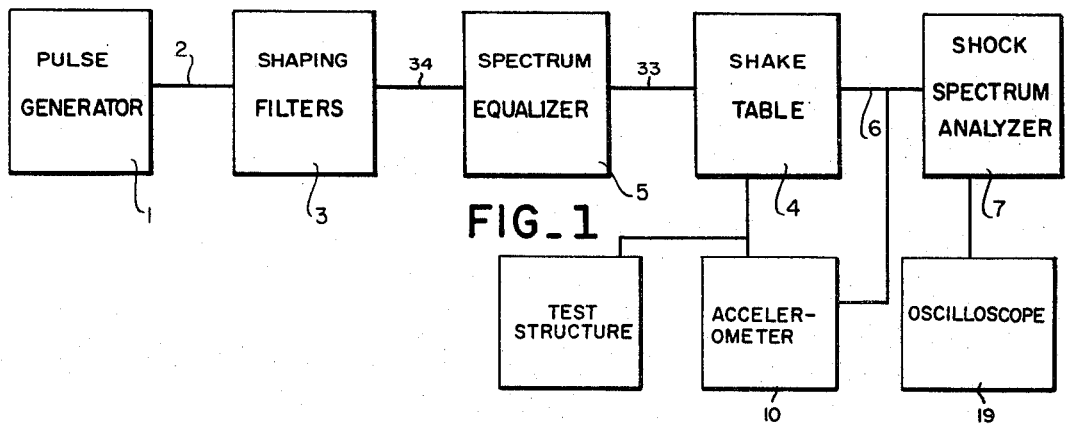
FIG_1
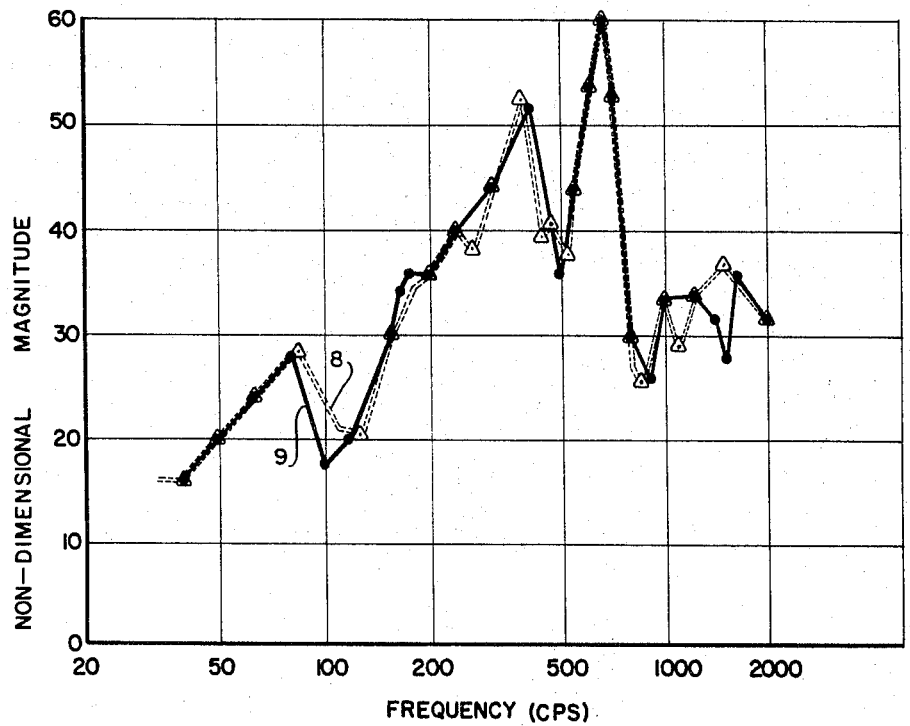
FIG_2
INVENTORS
GILES W. PAINTER
HUGH J. PARRY
By *George Sullivan*
Agent

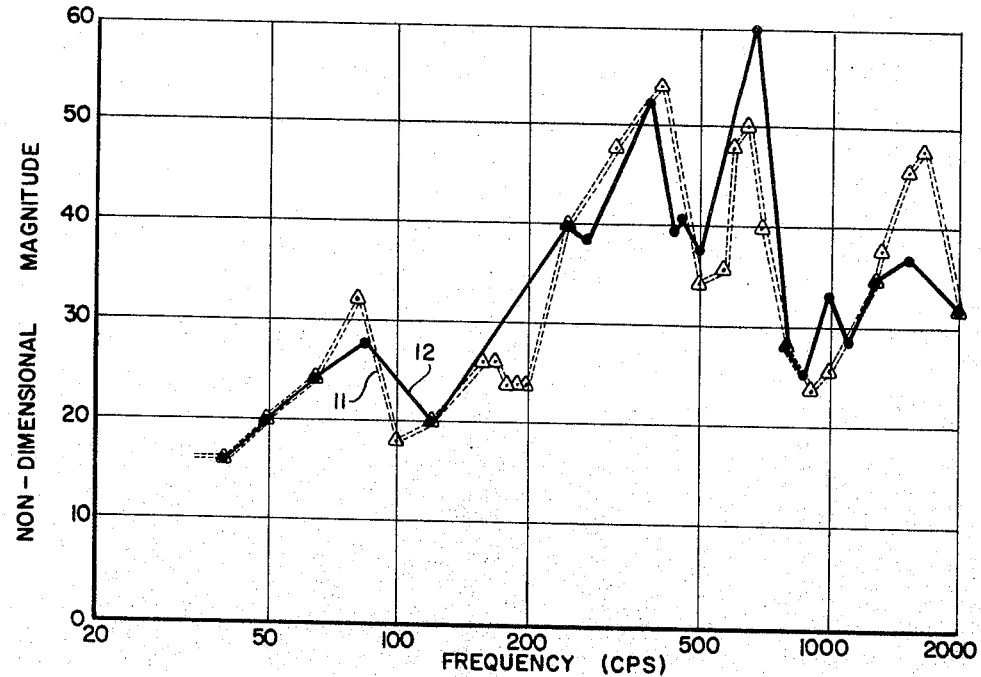
FIG_3
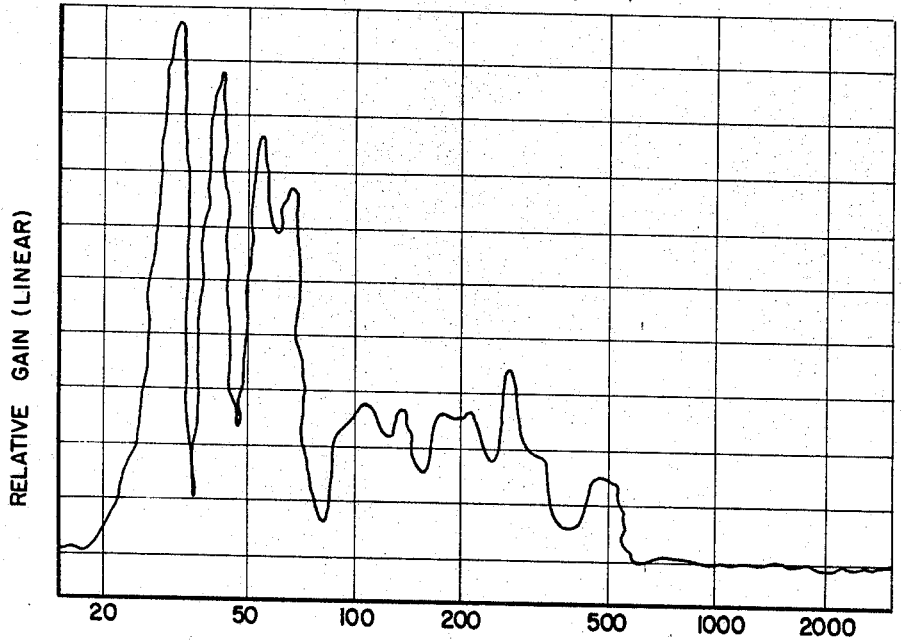
FIG_6

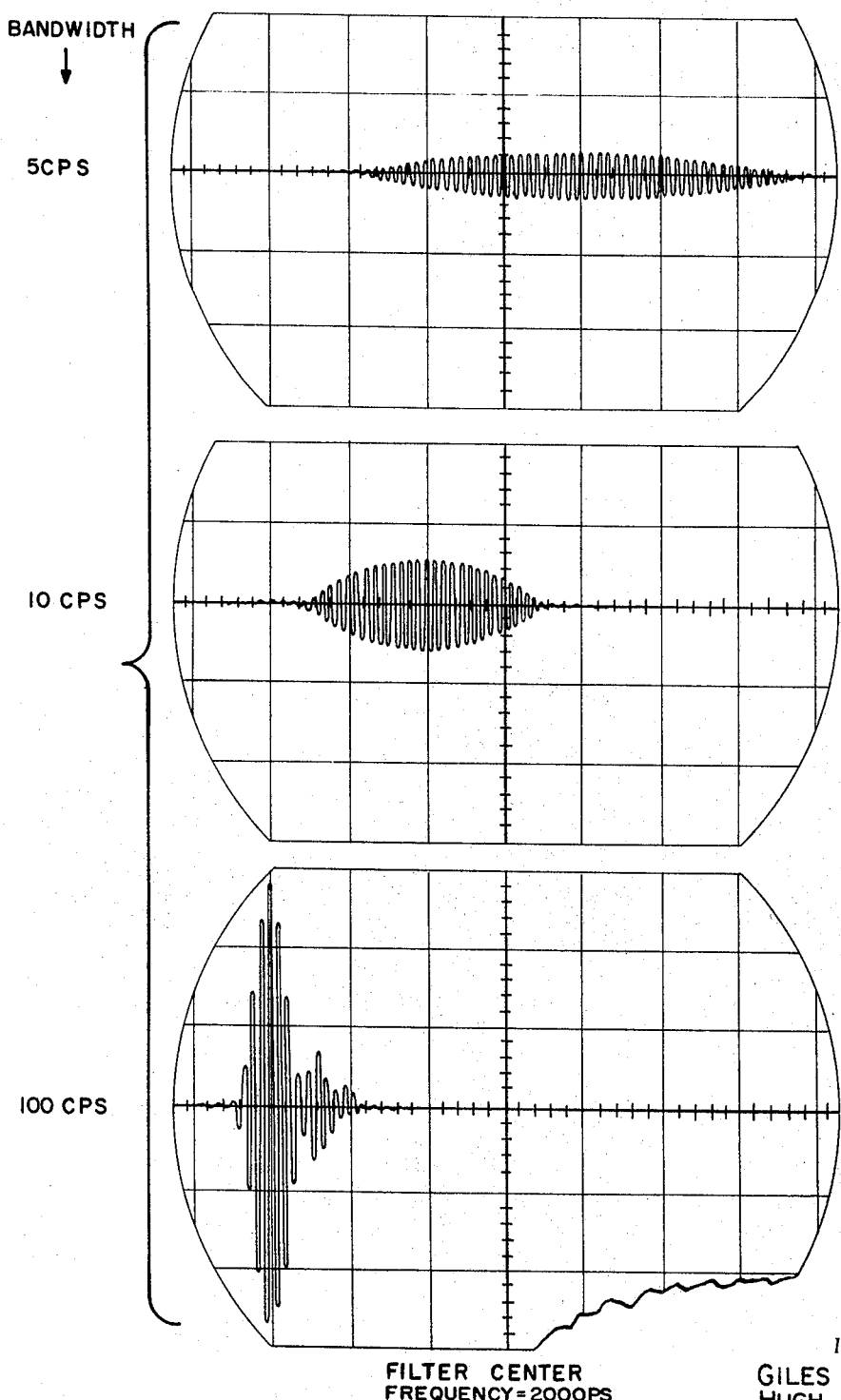

Oct. 10, 1967  G. W. PAINTER ETAL  3,345,864
TRANSIENT SYNTHESIS METHOD AND APPARATUS
Filed July 14, 1964  4 Sheets-Sheet 4
FIG_5
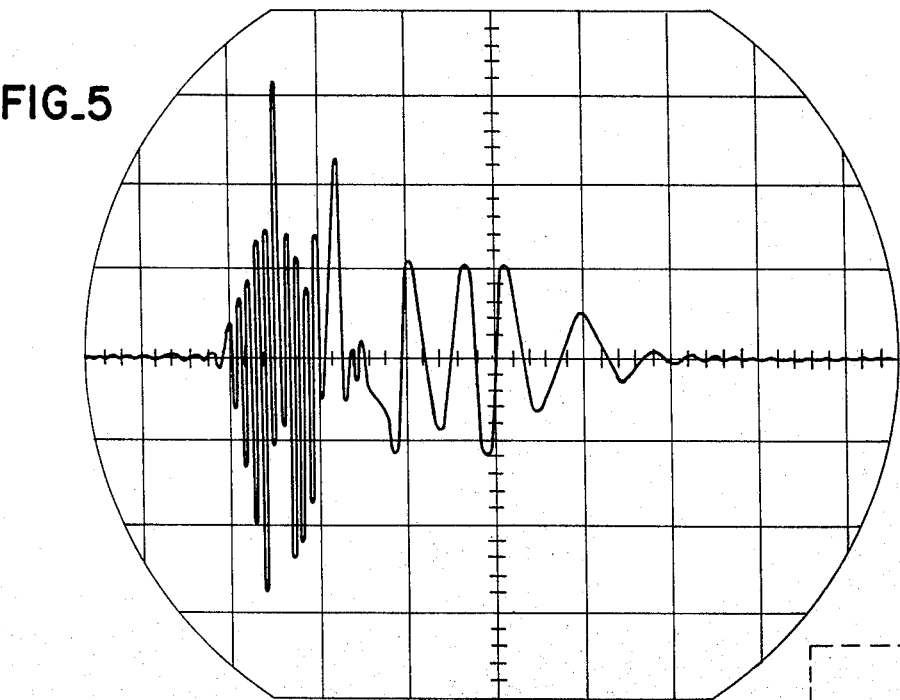
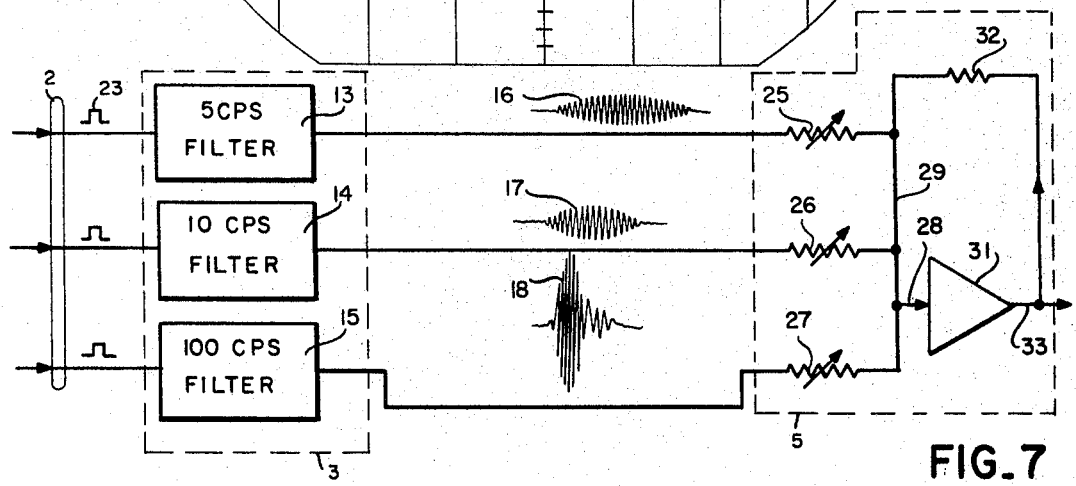
FIG_7
INVENTORS
GILES W. PAINTER
HUGH J. PARRY
By *George C. Sullivan*
Agent 3,345,864
**TRANSIENT SYNTHESIS METHOD
AND APPARATUS**
Giles W. Painter, Granada Hills, and Hugh J. Parry, North Hollywood, Calif., assignors to Lockheed Aircraft Corporation, Burbank, Calif.
Filed July 14, 1964, Ser. No. 382,493
8 Claims. (Cl. 73—71.6)

This invention relates to pulse waveform generation for dynamic testing, and more particularly to a novel method for producing oscillatory acceleration transients with selectable shock spectra which may be used to drive an electrodynamic shake table.

Shock testing of structures is usually accomplished by drop testing or by impacting the equipment with a moving mass. More recently attempts have been made to use electrodynamic shake tables for applying the desired test transient. These efforts have accompanied the production of large shake tables and electronic amplifiers, and have arisen not only from the desire to allow greater flexibility in controlling the magnitude and duration of the test pulse, but also from a consideration of potential cost reduction that can be realized if the same apparatus could be used for both shock and vibration testing. For the most part, the use of electrodynamic shake tables has been confined to the production of approximate classical time functions, such as the half-sine and saw-tooth acceleration pulses. These test pulses generally bear little resemblance to the complex transients actually experienced in the operating environment encountered in missiles and space vehicles during ignition, stage separation, and landing impact. The amplitude and duration of the test pulses are generally so chosen as to produce a shock spectrum that is, at all frequencies, in excess of that associated with transients measured in the actual operating environment. Since the pulse shape fixes the shape of the response spectrum, the test engineer must accept spectral magnitudes at some frequencies that are considerably in excess of operational levels. Furthermore, it is usually not possible to ameliorate the distortion introduced by the dynamic response of the test fixture.

A commonly employed method for describing a shock transient involves the determination of the response spectrum produced by the transient. The response spectrum does not define the shock transient, but instead defines the effect of the shock upon the dynamic response of hypothetical single-degree-of-freedom resonators having various natural frequencies. There are several types of response spectra which are employed. First of all, the hypothetical resonators may be damped or undamped, thereby yielding damped or undamped response spectra. Secondly, the total response spectrum, whether damped or undamped, can be divided into a primary spectrum and a residual spectrum. The primary spectrum is defined as the peak value of the response that occurs during the time interval that the shock transient is in effect; the residual spectrum is the peak response after the shock transient has terminated. The peak response that occurs, irrespective of when it occurs, defines the total spectrum. In practice, the total spectrum is generally employed, and in general, some level of damping is assigned to the hypothetical resonators.

A response spectrum is a measure of the shock transient only in a very restricted sense. There does exist a one-to-one correspondence between the absolute value of the Fourier spectrum of the transient in the undamped residual spectrum, but no such relation exists for total spectrum. Even for the case of a defined undamped residual spectrum, it is not possible to define the shock transient (or its complex Fourier spectrum) since no phase information is available.

Heretofore, little attention has been given to the problem of determining the transient time functions that will yield given response spectra versus frequency patterns. Nevertheless, there has existed a real need to devise laboratory environmental shock tests whose response spectra would follow some desired variation over the frequency range of interest. As mentioned hereinabove, prior to this invention this need has been sidestepped by employing shock test machines to produce a time function that approximates a classical pulse shape (such as a half-sine, triangular, or square pulse). The response spectra associated with these "classical" pulses are well known and by making the pulse amplitude great enough, a sufficiently severe test can be achieved.

There are a number of disadvantages associated with using classical pulse tests and among them is the limited control over shaping the spectrum contour. As a result, excessive response levels must usually exist at certain frequencies in order to assure sufficiently high levels at other frequencies.

Electromagnetic vibration shake tables have been sufficiently refined, that some interest has been directed to their use for shock testing. For convenience and brevity throughout the following description the term "shaker" will be used to indicate an electrodynamic shake table. Originally, primary interest centered on using shakers to obtain classical pulses, but more recently the emphasis has been on producing rather complicated oscillatory shock transients that are similar to those measured in flight vehicles. To this end, it is highly desirable to devise a method for defining oscillatory transients that will produce a desired spectral pattern. In particular, assuming that a shaker can produce an input transient with limited distortion, it is desirable to not only define a suitable shock transient, but also to produce it in the form of electrical input signals to the shaker. The present invention provides a method for producing electrical transients having a response spectrum which closely approximates a desired pattern over the frequency range of interest. The equipment utilized to accomplish the method of the present invention is entirely compatible for use with commercially available random vibration test equipment. Secondly, it allows both shock and vibration tests to be conducted with a single test machine or shaker.

It is therefore the principal object of the present invention to provide novel and improved methods and apparatus for pulse waveform generation, useful in dynamic testing of structures.

Another object of the invention is to provide novel and improved techniques for the generation of motion-time transients.

Still another object of the invention is to provide novel and improved shock testing methods and apparatus.

Yet another object of the invention is to provide novel and improved shock testing means and methods which can be conducted with the same test machine employed in vibration testing.

It is still another object of the invention to provide novel means and methods for the generation of a transient waveform which can be selectively shaped to provide a close approximation of a desired shock spectrum.

It is yet another object of the invention to provide novel and improved dynamic testing means and methods which may be used to substantially eliminate non-representative oscillations peculiar to test fixture design, if desired.

It is still another object of the invention to provide a novel and improved shock test technique which eliminates the unrealistic load imposed upon components having a low natural frequency, by the high velocity change associated with shock testing techniques used heretofore.

A general object of this invention is to provide novel and improved shock testing methods and apparatus which overcomes disadvantages of previous means and methods heretofore intended to accomplish generally similar purposes.

The invention will be understood more completely from the following detailed description taken in conjunction with the drawings in which:

FIGURE 1 is a block diagram of apparatus suitable for use in carrying out the novel method of invention.

FIGURE 2 graphically illustrates a simulated positive shock spectrum and a recorded transient envelope in which a non-dimensional magnitude is plotted along the axis of the ordinate and frequency in cycles per second is plotted along the axis of the abscissa.

FIGURE 3 is a graphic representation of a simulated negative shock spectrum as compared with a recorded transient envelope in which a non-dimensional magnitude is plotted along the axis of the ordinate and frequency in cycles per second is plotted along the axis of the abscissa.

FIGURE 4 is a set of oscillograms showing the voltage transients which may be derived from seletced bandpass filters in response to a single impulse applied to their inputs.

FIGURE 5 is an oscillogram of the voltage transients associated with the spectra given in FIGURE 2.

FIGURE 6 is a graphic representation of the absolute Fourier spectrum of the transient shown in FIGURE 5, in which relative linear gain is plotted along the axis of the ordinate and frequency in cycles per second is plotted along the axis of the abscissa.

FIGURE 7 is a schematic diagram of a circuit for combining the individual filter outputs to provide the synthesized shock transient spectra.

The method of the invention is based upon the fixed relation that exists between the undamped residual response spectrum and the absolute value of the complex Fourier transform of the transient producing the residual spectrum. It can be shown that if the undamped residual acceleration spectrum at a frequency $\omega_n$, is given by $A_n$, then:

$$|F(\omega_n)| = \frac{A_n}{n} \quad (1)$$

where:

$$|F(\omega_n)|$$

is the absolute Fourier spectrum of shock transient.

Equation 1 establishes the value of the absolute Fourier transform required to produce $A_n$ at $\omega_n$.

It is of importance to note that Equation 1 shows that the variation of the residual spectrum with frequency is entirely independent of phase angle. Thus, it is possible to calculate a time function $F(t)$ that would yield $|F(\omega_n)|$ by assuming an arbitrary phase angle variation with frequency. The present invention involves, for a given $|F(\omega_n)|$ or $A_n$, the production of one such time function as an electrical voltage transient. A practical application of the method of the invention consists of using a set of controllable gain filters for shaping a transfer function whose absolute value corresponds approximately to a desired $|F(\omega_n)|$. The voltage transient is obtained from the filter set output when a unidirectional voltage pulse of very short duration (of the order of $10^{-5}$ seconds), is applied to the inputs of the filters comprising the set. This implementation of the method of the invention is based on the fact that a response signal whose Fourier transform corresponds to the transfer function of a given dynamic system can be created by exciting the system with a unit impulse. As will also appear from the ensuing description, the method can be used for producing time functions that will yield a desired variation in total shock or response spectrum.

Although it is possible by analytical methods to derive any number of time functions that would satisfy a given absolute Fourier spectrum, the present invention meets the practical necessity of providing a method which permits the test engineer to rely upon instrumentation alone for deriving and producing a required acceleration transient. The method of the invention not only provides for the generation of time transients whose absolute Fourier transform approximates a desired value, but is also suited to the generation of complex transients that will yield a close approximation of desired shock spectra patterns.

There is shown in FIGURE 1 a block diagram of the apparatus used in carrying out the shock spectrum synthesis method of the invention. A pulse generator 1 suitable for producing short square-wave pulses is used as the generating source. The filter drive pulse produced by generator 1 is sufficiently short (of the order of 100 microseconds) to have an associated Fourier transform which is virtually flat from zero to above 2000 cycles per second (c.p.s.). The voltage pulse is applied via line 2 in parallel to a network of compensating and shaping filters 3. Shaping filters 3 comprise a plurality of ⅓-octave band filters having center frequencies in a range extending from 20 c.p.s. to 2000 c.p.s. It should be understood, however, that the invention is not limited to a particular filter design. The outputs of filters 3 are weighted via spectrum equalizer 5, summed, amplified, and supplied as a complex transient waveform to shake table 4. Voltage transients derived from three typical bandpass filters of the type which may be employed for shaping filters 3 are shown in FIGURE 4. The shake table motion transient is sensed by an accelerometer 10 whose output signal is fed via line 6 to a shock spectrum analyzer 7. The weighting of the outputs from filters 3 is adjusted to give the desired shock spectrum as indicated by shock spectrum analyzer 7. The analyzer 7 may be of any suitable construction and may, for example, be of the type shown and disclosed in co-pending application, Ser. No. 403,818 filed Oct. 14, 1964, of common assignee herewith. It is to be understood that inasmuch as the shock spectrum analyzer does not constitute part of the instant invention, only so much as the structural details and operational features thereof considered to be essential for complete understanding of this invention are described hereinafter.

The analyzer 7 employs a series of networks and operational amplifiers and can be considered to be a special-purpose analog computer. The Q of the analyzer is continually adjustable over a range of 5 to 50. Once selected, Q remains constant as the resonance of "sampling" frequency as adjusted. This frequency is continuously variable in an interval from 20 to 2000 c.p.s.

In tests that employ classical unidirectional pulses, the severity of the test specification derived is greatly dependently upon the Q value that is assumed for the hypothetical resonators in deriving shock spectra from flight transients. An advantage of the present invention is that the choice of Q becomes less critical when oscillatory test transients are synthesized to yield damped spectra based upon the same Q value used in determining the shock spectra of transients recorded in flight.

The transient synthesis procedure is as follows: The shaker system is first equalized by the conventional techniques used in random vibration testing. The network of ⅓-octave band shaping filters 3 is then introduced into the system. The filter drive pulse on line 2 is applied to all of the ⅓-octave band filters 3 simultaneously, at periodic intervals. The output transients from all of the filters 3 are fed to a summing amplifier whose output is in turn passed to the shock spectrum equalizer 5. Separate gain controls are provided for each of the ⅓-octave band shaping filters, as will be more readily understood from the discussion of FIGURE 7, in a subsequent part of this specification. The output of the shock spectrum analyzer 7 is affected by all frequencies that fall below the sampling frequency, but very little by higher frequencies. For this reason, transient synthesis involves a "building block" process. The lowest frequency components are introduced first, and high frequencies are added sequentially. Synthesis is accomplished by first reducing all filter gain controls, except for the one associated with the lowest band, to zero. With the frequency of the shock spectrum analyzer set at the center frequency of the first ⅓-octave band, the gain of the latter is adjusted until the peak response of the analyzer 7, as indicated on an oscilloscope 19, has the desired magnitude. The same procedure is followed as higher and higher ⅓-octave bands are introduced until the acceleration transient produces the required shock spectrum envelope over the entire frequency range of interest.

The choice of ⅓-octave band filters for shaping the shaker drive transient is an arbitrary one, and the actual construction of the filters is dependent upon the nature of the desired shock spectrum envelopes. For example, series-connected peak-notch filters could be employed in lieu of parallel-connected ⅓-octave band filters. With this alternative, the transmission characteristics of the filters are multiplied rather than summed as in the case of bandpass filters.

In the exemplary case which follows, the shock spectra envelopes are generally rather smooth and contain no sharp peaks or notches. The production of peaks with jagged spectra would require shaping filters of narrower bandwidth. Sharp deviations in shock spectra which might arise from narrow peaks and notches tend to become increasingly subdued as the Q of the spectrum analyzer is decreased. In a majority of cases, the Q of the analyzer may be set at 10, a value that previously has been employed in deriving the shock spectra associated with transients measured in flight.

There is shown in FIGURES 2 and 3 a synthesized voltage transient and the actual spectra based on transients recorded during flight test of an aerospace vehicle. The transient envelope as recorded in an actual flight is indicated by the dotted line 8 connecting the points indicated by the symbol △. The simulated spectrum (positive) is indicated by the solid line 9 connecting the points indicated by the symbol ⊕. The agreement between the desired (8) and the produced (9) spectra is seen to be very close. The shock spectrum shown in FIGURE 3 is similar to the spectrum of FIGURE 2 except that it is negative rather than positive. The flight transient envelope is indicated by the dotted line 11 and the simulated spectrum (negative) is indicated by the solid line 12. As can be seen by comparing the envelopes of FIGURES 2 and 3, the positive and negative spectra are virtually identical, thus eliminating the need for changing equipment orientation.

There is shown in FIGURE 4 separate oscillograms of three bandpass filters having various bandwidths, but identical center frequencies. The center frequency in each instance is 2000 c.p.s. The uppermost oscillogram illustrates the output of a filter having a bandwidth of 5 c.p.s. in response to a unit impulse at the input to initiate ringing. The center oscillogram shows that the envelope is somewhat shorter in time for a filter having a 10 c.p.s. bandwidth, upon being excited in the same manner. The lower oscillogram is of a filter having a 100 c.p.s. bandwidth; in this instance, the time duration of the envelope is still shorter, but the peak amplitude is substantially higher. Waveforms such as shown in FIGURE 4, upon being weighted and summed will provide a complex transient of the desired spectrum pattern. The oscillogram of FIGURE 5 represents the voltage transients associated with the spectra given in FIGURE 2. The absolute Fourier spectrum for the same transient is graphically shown in FIGURE 6.

As the effective bandwidth of the synthesized shock transient increases, the ratio of the peak acceleration of the shock spectrum to the peak acceleration (magnification ratio) of the transient decreases. The transients that produce the shock spectra shown in FIGURE 2 have rather broad band Fourier spectra and the associated magnification ratio, based on a Q of 10, is approximately 3. This compares very favorably with theoretical values of 1.6 and 1.9 for the half-sine pulse and unit step, respectively. The transient produced by ringing a single ⅓-octave band filter with a unit impulse gives a magnification ratio of approximately 6.

There is shown in FIGURE 7 a schematic circuit diagram of the shaping filter and spectrum equalizer (blocks 3 and 5 of FIGURE 1). The filter drive impulse is applied simultaneously to filters 13–15. Each of these filters has a center frequency of 2000 c.p.s., but each has a different bandwidth. Filter 13 has a bandwidth of 5 c.p.s., filter 14 has a bandwidth of 10 c.p.s., and filter 15 has a bandwidth of 100 c.p.s. The filter drive impulse 23 has a short time duration and will cause each filter to ring.

The length and height of the driving pulse control the energy input to the filter and thus determine the overall output amplitude; however, the driving pulse must be short in order to contain the higher spectral components. Thus, the pulse width must be sufficiently short to have a Fourier spectrum which is substantially flat over the range of frequencies of interest. As mentioned hereinabove, a pulse width of 100 microseconds has been found to be suitable in actual practice and has an associated Fourier transform which is virtually flat from zero to 2000 c.p.s. The duration of ringing is inversely proportional to the bandwidth of the filter, and the ringing frequency corresponds to the center frequency of the filter. The envelope of the output signal for filter 13 is indicated at 16, and, as can be seen, occurs over a longer time interval than does the envelope for the output 17 of filter 14. Similarly, the transient output 18 of filter 15 has a shorter duration than that of filter 14.

The outputs 16–18 of each of the filters 13–15, respectively, are supplied to amplifier 31 via corresponding attenuators 25–27, respectively. Attenuators 25–27 permit the separate filter outputs 16–18 to be mixed in the desired relative amplitudes and supplied via line 28 to the input of amplifier 31. Negative feedback around amplifier 31 is provided by feedback resistor 32. The output of the amplifier of 31 is supplied via line 33 to the shake table.

The particular transient synthesis described hereinabove is exemplary and is by no means confined to the spectra patterns that have been described. In fact, if an adequate supply of shaping filters is available, there is virtually no limit to synthesis capabilities. It might be desired, under certain circumstances, for instance, to simulate transients that involve prolonged ringing at certain frequencies, so as to simulate the behavior of a lightly damped structure vibrating in its normal mode. These transients can be readily simulated by employing narrow bandwidth peak-notch or second order filters as wave shaping elements. Also, it is to be understood that the method is equally well suited to the simulation of the absolute Fourier spectra as well as a specified shock spectra. Actually, in some cases, it may be more desirable to design the transients to yield a specified Fourier spectrum, as this spectrum provides a considerably better description of the structural response than damped shock spectra.

In summary, the novel and improved dynamic test method described hereinabove is highly practical and entirely compatible with commercially available shake table systems. Since certain changes may be made in the above method and apparatus without departing from the scope of the invention herein involved, it is intended that all matter contained in the above description or shown in the accompanying drawings shall be interpreted as illustrative and not in a limiting sense. For example, the method of the invention can be extended to simulate desired three-dimensional spectral envelopes.

We claim:
1. The method of producing an electrical transient having a response spectrum corresponding to a desired pattern over a given frequency range, comprising the steps of:
   generating a driving pulse having a duration substantially shorter than the duration of the electrical transient to be produced;

simultaneously applying said driving pulse to a plurality of variable-gain, band filters having dissimilar frequency transmission characteristics;

individually adjusting the gain of said filters to selectively modify the relative amplitudes of the outputs therefrom; and combining the modified outputs of said filters and thereby produce said electrical transient.

2. The method of producing an electrical oscillatory transient having a given spectrum envelope, comprising the steps of:

generating a pulse which is sufficiently short to have a Fourier spectrum which is substantially flat over a given range of frequencies;

applying said pulse simultaneously to a plurality of filters, each of which has a successively wider bandwidth to cause said filters to ring;

combining the outputs of said plurality of filters to provide a complex waveform; and sequentially adjusting the amplitude of the output of each of said filters, beginning with the filter having the narrowest bandwidth, to modify said complex waveform and thereby produce said given spectrum envelope.

3. The method of producing an electrical oscillatory transient having a given spectrum envelope which is an approximate analog of the spectrum envelope generated by an original source, comprising the steps of:

recording the spectrum envelope from said original source;

analyzing said recorded envelope by means of a spectrum analyzer to indicate the respective amplitudes of the frequency components thereof;

generating a driving pulse;

applying said pulse simultaneously to a plurality of filters, each of which has a successively wider bandwidth, to cause said filters to ring;

combining the outputs of said plurality of filters to provide a complex waveform;

analyzing said complex waveform by means of a spectrum analyzer to indicate the amplitudes of the frequency components thereof; and adjusting the amplitude of the output of each of said filters so that the frequency components of said complex waveform correspond to the frequency components of said given spectrum envelope.

4. The method of producing an electrical oscillatory transient having a given spectrum envelope, comprising the steps of:

generating a pulse which is sufficiently short to have a Fourier spectrum which is substantially flat over a given range of frequencies defined by the spectrum limits of said envelope;

simultaneously applying said pulse to a plurality of ⅓-octave band filters each having a different center frequency within said range of frequencies;

applying the outputs of said filters to corresponding ones of a plurality of attenuators;

summing the outputs of said plurality of attenuators to provide a complex waveform; and adjusting said attenuators so that the amplitudes of the frequency components comprising said summed output correspond to the amplitudes of the frequency components of said given spectrum envelope.

5. The method of shock testing a structure comprising the steps of:

mounting said structure on an electrodynamic shaker means;

generating a driving pulse;

applying said pulse to a plurality of filters, each of which has a successively wider bandwidth, in order to cause said filters to ring;

combining the outputs of said plurality of filters to provide a complex waveform;

sequentially adjusting the amplitude of the output of each of said filters, beginning with the filter having the narrowest bandwidth, to modify said complex waveform and thereby produce a given spectrum envelope; and driving said shaker means with said complex waveform having said spectrum envelope.

6. The method of shock testing a structure comprising the steps of:

mounting said structure on an electrodynamic shaker means;

generating a driving pulse;

simultaneously applying said driving pulse to a plurality of bandpass filters having dissimilar bandpass center frequencies, to cause said filters to ring;

combining the outputs of said plurality of said filters to provide a complex waveform;

sequentially adjusting the amplitude of the output of each of said filters, beginning with the filter having the lowest bandpass center frequency, to modify said complex waveform and thereby produce a given Fourier spectrum envelope; and driving said shaker means with said complex waveform having said spectrum envelope.

7. Apparatus for producing an electrical transient waveform having a given response spectrum, comprising:

a pulse generator;

a plurality of bandpass filters having dissimilar bandpass center frequencies within a frequency range defined by the limits of said spectrum, said filters each having an input and an output, said inputs being connected in common to simultaneously receive a pulse from said generator;

a plurality of attenuators each connected to a corresponding one of said outputs and each adapted to modify the gain of a corresponding one of said filters; and means connected to said attenuators for summing the modified outputs of said filters and thereby provide said waveform.

8. Apparatus for applying a shock transient, having desired response spectra to a test structure comprising:

an electrodynamic shaker drivingly coupled to said test structure;

accelerometer means connected with said test structure so as to be responsive to a motion transient applied thereto;

a shock spectrum analyzer connected to said accelerometer means responsive thereto for indicating a motion transient sensed by said accelerometer means;

a pulse generator;

a plurality of filters having dissimilar band widths each having an input and an output and adapted to be driven from a pulse from said pulse generator;

means for combining the outputs of said filters;

an amplifier having its input connected to said combining means;

means connecting the output of said amplifier to said shaker; and a plurality of attenuators each adapted to adjust the output amplitude of corresponding ones of said filters and thereby modify the response spectra indicated by said analyzer to conform to said desired response spectra.

References Cited

UNITED STATES PATENTS

| | | | |
|---|---|---|---|
| 3,015,949 | 1/1962 | Arnold | 73—71.5 |
| 3,100,284 | 8/1963 | Kerns | 328—156 XR |
| 3,100,393 | 8/1963 | Bell | 73—71.6 |

JAMES J. GILL, *Acting Primary Examiner.*

RICHARD C. QUEISSER, *Examiner.*

C. A. RUEHL, *Assistant Examiner.*